US009788026B2

United States Patent
Botsford et al.

(10) Patent No.: US 9,788,026 B2
(45) Date of Patent: Oct. 10, 2017

(54) CONVERTING ADAPTIVE BITRATE CHUNKS TO A STREAMING FORMAT

(71) Applicant: IMAGINE COMMUNICATIONS CORP., Frisco, TX (US)

(72) Inventors: Nelson Botsford, Punta Gorda, FL (US); David Thomas, Summit, NJ (US)

(73) Assignee: Imagine Communications Corp., Frisco, TX (US)

( * ) Notice: Subject to any disclaimer, the term of this patent is extended or adjusted under 35 U.S.C. 154(b) by 0 days.

(21) Appl. No.: 14/835,265

(22) Filed: Aug. 25, 2015

(65) Prior Publication Data
US 2017/0064342 A1    Mar. 2, 2017

(51) Int. Cl.
| | |
|---|---|
| H04N 21/2381 | (2011.01) |
| H04N 21/234 | (2011.01) |
| H04N 21/236 | (2011.01) |
| H04N 21/238 | (2011.01) |
| H04N 21/845 | (2011.01) |
| H04N 21/2343 | (2011.01) |
| H04N 21/2365 | (2011.01) |
| H04N 21/2383 | (2011.01) |
| H04N 21/643 | (2011.01) |

(Continued)

(52) U.S. Cl.
CPC ..... *H04N 21/2381* (2013.01); *H04N 21/2365* (2013.01); *H04N 21/2383* (2013.01); *H04N 21/23406* (2013.01); *H04N 21/23439* (2013.01); *H04N 21/23608* (2013.01); *H04N 21/23805* (2013.01); *H04N 21/64322* (2013.01); *H04N 21/8456* (2013.01); *H04N 21/8547* (2013.01); *H04N 21/2402* (2013.01)

(58) Field of Classification Search
CPC ......... H04N 21/2381; H04N 21/23439; H04N 21/2365; H04N 21/2383; H04N 21/64322; H04N 21/8547
See application file for complete search history.

(56) References Cited

U.S. PATENT DOCUMENTS

| | | | |
|---|---|---|---|
| 6,993,081 B1 * | 1/2006 | Brunheroto | H04N 21/23406 370/487 |
| 2006/0056383 A1 * | 3/2006 | Black | G10L 19/005 370/350 |
| 2009/0222873 A1 | 9/2009 | Einarsson | |

(Continued)

OTHER PUBLICATIONS

European Search Report for European Patent Application No. 16001870.1-1908, dated Nov. 12, 2016.

(Continued)

*Primary Examiner* — Benjamin R Bruckart
*Assistant Examiner* — Susan X Li
(74) *Attorney, Agent, or Firm* — Tarolli, Sundheim, Covell & Tummino LLP

(57) ABSTRACT

As one example, a method can include receiving a series of chunks of media content encoded according to an adaptive bitrate format. The method also includes setting a buffer utilization value for a compressed data buffer. The method also includes adjusting timestamps of each packet in a given chunk to provide a preprocessed chunk, which includes the adjusted timestamps and the buffer utilization value. The method also includes streaming the preprocessed chunk in an output transport stream at variable bitrate set according a predetermined chunk time duration and based on the adjusted timestamps.

22 Claims, 6 Drawing Sheets

(51) Int. Cl.
H04N 21/8547 (2011.01)
H04N 21/24 (2011.01)

(56) References Cited

U.S. PATENT DOCUMENTS

| | | | |
|---|---|---|---|
| 2010/0142915 A1 | 6/2010 | McDermott et al. | |
| 2011/0149826 A1* | 6/2011 | Choi | H04N 21/4622 370/312 |
| 2012/0128061 A1 | 5/2012 | Labrozzi et al. | |
| 2014/0013376 A1* | 1/2014 | Xu | H04N 21/25 725/116 |
| 2014/0140417 A1 | 5/2014 | Shaffer et al. | |
| 2015/0281752 A1* | 10/2015 | Van Veldhuisen | H04N 21/2368 725/116 |
| 2016/0150255 A1* | 5/2016 | Grinshpun | H04N 21/23805 725/62 |

OTHER PUBLICATIONS

Chenghao Liu et al: "Rate adaptation for dynamic adaptive streaming over HTTP in content distribution network", Signal Processing: Image Communication, vol. 27, No. 4, Apr. 1, 2012 (Apr. 1, 2012), pp. 288-311.

* cited by examiner

CONVERTING ADAPTIVE BITRATE CHUNKS TO A STREAMING FORMAT

TECHNICAL FIELD

This disclosure relates generally to converting adaptive bitrate chunks to a streaming format.

BACKGROUND

Significant investments are being made to transition from legacy quadrature amplitude modulation (QAM)-based video delivery to internet protocol (IP)-based delivery. At a high level, this can affect many aspects of the content delivery network infrastructure. While the IP-based delivery can provide advantages over QAM-based delivery, many providers still implement legacy edge systems for distribution to end users, which may likewise implement legacy devices. For example, while a national IP backbone can be implemented to deliver the majority of content to regional and local headends, such headends still need to support many legacy QAM devices.

SUMMARY

This disclosure relates generally to converting adaptive bitrate chunks to a streaming format.

As an example, a method includes receiving a series of chunks of media content encoded according to an adaptive bitrate format. The method also includes setting a buffer utilization parameter for a compressed data buffer. The method also includes adjusting timestamps of each packet in a given chunk to provide a preprocessed chunk, which includes the adjusted timestamps and the buffer utilization value. The method also includes streaming the preprocessed chunk in an output transport stream at variable bitrate set according to a predetermined chunk presentation duration and based on the adjusted timestamps.

Another example provides a system that includes an input connected to receive adaptive bitrate (ABR) chunks of media content. An ABR translator is configured to process the ABR chunks to provide an output stream that is compliant with a transport protocol. The ABR translator includes a compressed data buffer controller configured to set a buffer utilization parameter to constrain utilization of a decode buffer to a buffer level that is a fractional part of a maximum buffer level. The ABR chunks can be encoded based on the buffer utilization parameter. The ABR translator also includes a timestamp control configured to adjust at least one timestamp of access units in each of the ABR chunks to provide preprocessed chunks. Each preprocessed chunk can include the adjusted timestamps. The ABR translator generates an output stream by concatenating the preprocessed chunks to provide the output stream at a bitrate that maintains the playout duration equal to the corresponding chunk presentation duration.

DETAILED DESCRIPTION

This disclosure relates generally to a system and method for translating ABR chunks to another streaming media.

As disclosed herein, ABR chunks of media content (e.g., audio, data and/or video) can be received at an ABR translator for processing and conversion to another format. For example, each chunk of the input ABR data can be configured for playout from the ABR translator within a predefined chunk presentation duration. To mitigate overflow and underflow of a decoder buffer, a compression of media content can be controlled to limit buffer utilization as part of the encode process. For example, for a video elementary stream, the video buffer verifier (VBV) can be controlled during video compression to limit VBV buffer utilization. By also adjusting timestamps of access units in the given chunk, the buffer level at the beginning of each chunk can be set to a pre-defined value. By processing the ABR chunks in this manner, ABR chunks from different profiles can be concatenated and sent downstream in a fully compliant transport stream that avoids overflow or underflow of the compressed data buffer at the decoder. As one example, the transport stream can be an MPEG compliant stream communicated via a connectionless transport layer protocol (e.g., a user datagram protocol (UDP)). The ABR translator and related methods disclosed herein are not limited to generating an MPEG compliant stream, but are equally applicable to other audio, video and data encoding technologies, such as H.264, H.265 and Dolby audio to name a few.

Figure 1:
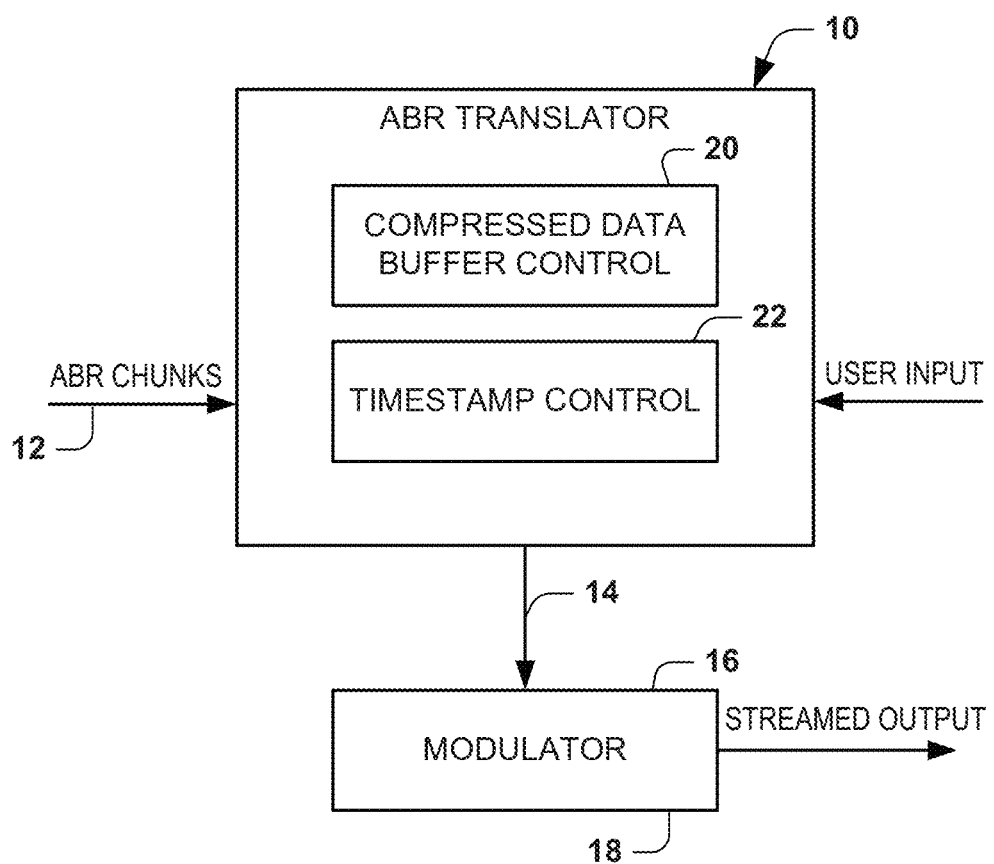
FIG. 1 depicts an example of an ABR translator to convert ABR chunks into a streaming format.

FIG. 1 depicts an example of an ABR translator 10 configured to receive an input that comprises data chunks of media at 12 and to convert each of the chunks to another form streaming media at an output demonstrated at 14. The translator 10 can be configured to process chunks of video, audio or other timestamped data. For purposes of consistency and simplicity of explanation, in the following examples disclosed herein, the chunks of media are described in the context of ABR chunks of encoded video, which are generated by an encoder (e.g., a transcoder). The encoder is controlled, such as in response to a control parameter, to constrain the buffer utilization in the encode process that generates each of a plurality of ABR profiles of encoded video for a given media asset.

For example, the ABR translator 10 can process and translate each of the ABR chunks received at 12 to provide the output stream 14. The ABR translator 10 can generate the output stream 14 with a variable bit rate that maintains compliance with the protocol implemented by one or more downstream clients. That is, the ABR translator 10 is configured to process the input ABR chunks 12 to ensure that one or more downstream decoder buffers do not overflow or underflow. The ABR translator 10 can be implemented in hardware (e.g., a field programmable gate array (FPGA), an application specific integrated circuit (ASIC), a microprocessor and/or other circuitry), in machine executable instructions embodied in a non-transitory medium (e.g., software or firmware) or a combination thereof.

Examples of ABR technologies that can be received as inputs at 12 to the ABR translator 10 can include hypertext transfer protocol (HTTP) Live Streaming (HLS), HTTP Smooth Streaming (HSS-1 or HSS-2), HTTP Dynamic Streaming (HDS), Dynamic Adaptive Streaming over HTTP (DASH) as well as other ABR delivery format. As used herein, the term "chunk" refers to a discrete encoded section of media content that can be independently decoded. Each chunk of ABR media content can be stored in non-transitory memory structure as a separate file. A given chunk of content is often referred to as a segment or fragment depending on which ABR technology is being implemented.

To create the compliant output stream at 14, the ABR translator 10 includes compressed data buffer control 20. The compressed data buffer control 20 is configured to control buffer utilization as a fractional part of a maximum decoder buffer utilization. For example, the compressed data buffer control 20 can be configured to impose a predetermined restriction on the buffer utilization (e.g., approximately ½ of the allowed maximum buffer level) at an upstream encoder without adversely affecting most ABR compression techniques, including H.264 encoding. The adjustment to buffer utilization can be implemented by setting buffer latency (e.g., delay) information, which can be employed at each encoder (e.g., transcoder) that generates the ABR chunks received at 12. That is, upstream encoders can employ the established compressed data buffer utilization level when encoding the ABR chunks, according to each ABR profile, which are received and processed by the ABR translator 10. In some examples, the ABR translator 10 can provide control instructions to set a compressed data buffer utilization parameter at each upstream encoder to constrain buffer utilization during the encode process.

As a further example, the buffer utilization can be restricted to a user-programmable level in response to a user input via a user interface device associated with each encoder performing data compression to provide the ABR chunks. The user thus can set the buffer utilization level to less than or equal to the predetermined amount. Thus, in response to the compressed data buffer control 20 restricting the buffer utilization, each chunk can be transmitted completely during the predefined chunk presentation duration without under flow or overflow in each decoder buffer that processes the output stream 14. As an example, the chunk presentation duration may be set to 2 seconds; although other duration values can be utilized. While the presentation duration of chunks in a given stream can vary from one chunk to the next chunk, the playout duration of each chunk is equal to the corresponding presentation duration in each chunk.

If the compressed data buffer utilization is restricted in this manner, discontinuities may still result from differences in the starting and ending buffer levels for different ABR chunks. For example, different chunks whether from the same ABR profile or different ABR profiles can include different amounts of data (e.g., different numbers of bytes) depending on the media content and/or profile employed for selecting each of the chunks. In some examples, such as where consecutive chunks are from different profiles (e.g., either the same program or different content altogether), significant discontinuities between starting and ending compressed data buffer levels can result. These discontinuities can occur in timestamps (e.g., presentation timestamp (PTS) and/or decode timestamp (DTS)) or in reference clocks (e.g., program clock reference (PCR), which are used by downstream decoder to decode the stream 14 and synchronize audio, data and video access units for presentation to one or more users via an associated display device.

To mitigate the discontinuities that might otherwise result under the restricted buffer utilization imposed by the compressed data buffer control 20 and playing out each chunk within the defined chunk presentation duration, the ABR translator 10 includes a timestamp control 22. The timestamp control 22 is configured to adjust one or more timestamps for a given chunk to achieve a predetermined offset with respect to the program clock reference at the beginning of the given chunk. For example, the timestamp control 22 can adjust the PTS, the DTS or both the PTS and DTS for access units of each chunk. The timestamp control 22 further determines the offset based on the buffer utilization parameter, which may be established by the compressed data buffer control 20.

As used herein the term PTS refers to a timestamp value that specifies a metadata field in an output stream (e.g., an MPEG transport stream program stream). The PTS is provided in units of time relative to a program's overall system time clock (STC). The program clock reference (PCR) or system clock reference (SCR) are samples of the STC value associated with transmission of a packet and are transmitted in the transport stream or program stream. The PTS thus provides a timing reference to achieve synchronization of a programs' separate elementary streams (e.g., video, audio, subtitles or the like) when presented to the viewer. The DTS is similar to the PTS, but indicates the time at which an access unit should be instantaneously removed from the buffer and decoded. It differs from the Presentation Timestamp (PTS) only when picture reordering is used for B pictures. If DTS differs from PTS then both PTS and DTS must be provided in the output stream (e.g., as metadata) 14, as adjusted by the timestamp control 22 of the ABR translator 10. The ABR translator 10 can provide the adjusted timestamps (e.g., PTS and/or DTS) as metadata in the output stream, such as associated within packets of each respective processed chunk in the output stream. Other timing and synchronization information (e.g., PCR value) can be provided in an adaptation field of the packets.

The ABR translator 10 can provide the converted, preprocessed output stream in the new format to a modulator 16 for generating a corresponding modulated version of the streamed output 18. The modulator 16 can be configured to implement a complex modulation scheme, which involves variation of more than one parameter, such as modulation of amplitude and phase or amplitude and frequency, such as 16-QAM, 64-QAM, 128-QAM, 256-QAM, 16-PSK, 16-APSK or the like. For example, the modulator 16 can implement complex modulation in which the processed chunks of media from the translator 10 are modulated to a radio frequency waveform for downstream transmission of streaming media data to one or more receivers.

The downstream receiver (not shown) thus is configured to demodulate, buffer and decode the streamed output to provide the output media at a prescribed bitrate (e.g., resolution). For instance, the bitrate of the ABR chunks provided to the ABR translator at 12 can be selected by statistical multiplexing and/or other selection techniques. As a result of the processing implemented by the ABR translator 10, the decode buffer in the downstream receiver is manipulated to prevent overflow or underflow and thus compliance with the prescribed protocol. Protocol compliance at the receiver is further enabled based on the translator 10 adjusting timestamps to facilitate decoding and presentation of the media content at the receiver.

Figure 2:
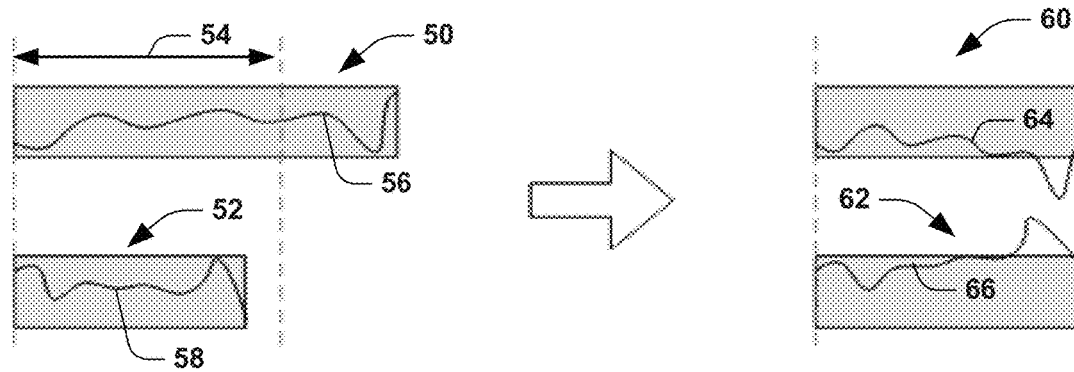
FIG. 2 depicts examples of corresponding errors in buffer levels for chunks being played out at different bitrates.

FIG. 2 depicts examples of differently sized chunks of media demonstrating playout of such chunks with the compressed data buffer utilization level being superimposed on each chunk over time during such playout. Time is understood to be propagating left to right with the illustrated playout. In the example of FIG. 2, chunk 50 is larger (contains more bits) than chunk 52. Thus, assuming that each of the chunks 50 and 52 is played out at the same bitrate, chunk 50 has a playout duration that exceeds a prescribed chunk presentation duration 54 and chunk 52 has a playout duration that is less than the chunk presentation duration. As mentioned, the buffer utilization level during playout of chunk 50 is demonstrated at 56 and buffer utilization for playout of chunk 52 is demonstrated at 58.

If each chunk is played out (e.g., by ABR translator 10) at a constant bitrate so that it is completely transmitted during the chunk presentation duration 54, as shown at 60 and 62, the buffer levels at the start and end of each chunk are substantially equal. As used herein, "substantially" is used as a modifier to indicate that while a given result or effect is intended some variation (e.g., +/−5%) may occur in a corresponding implementation. However, in this example, the buffer utilization levels 64 and 66 for each respective chunk playout 60 and 62 result in underflow and underflow, respectively, for intermediary buffer levels.

Figure 3:
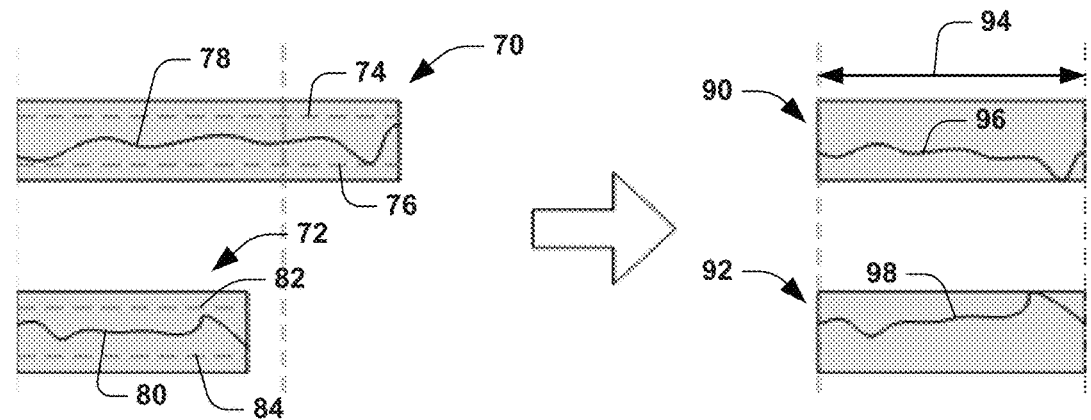
FIG. 3 depicts examples of corrected buffer levels for chunks being played out at different bitrates.

As disclosed herein and with reference to FIG. 3, the ABR translator 10 can restrict compressed data buffer utilization to ensure that there is no overflow or underflow, such as demonstrated for chunks 70 and 72. By imposing upper and lower limits on decoder buffer utilization, as shown at 74 and 76 for the playout 70, the corresponding buffer utilization 78 is constrained to remain within the upper and lower limits during such playout. The same result is demonstrated for playout of chunk 72; namely, its buffer utilization 80 remains between upper and lower limits 82 and 84 during playout of packets that form the given chunk. The lower limit on decoder buffer utilization can be at or close to zero provided that the range of buffer utilization (maximum-minimum) is restricted appropriately.

As disclosed herein, however, each chunk in the output stream (e.g., stream 14) needs to be played out during a respective chunk presentation duration to enable compliance with the downstream protocol (e.g., a legacy protocol, such as MPEG 2), even though each chunk may have different numbers of bits. Accordingly, the ABR translator (e.g., translator 10) provides the output stream with a variable bitrate that includes adjusted timestamps in conjunction with restricted compressed data buffer utilization. Such timestamp adjustments result in playout of compliant chunks 90 and 92 in which each chunk has the same the buffer utilization 96 and 98 at the beginning and ending of each respective chunk 90 and 92. The beginning and ending buffer levels can be set to a predefined value, which may be user programmable for a given stream.

Figure 4:
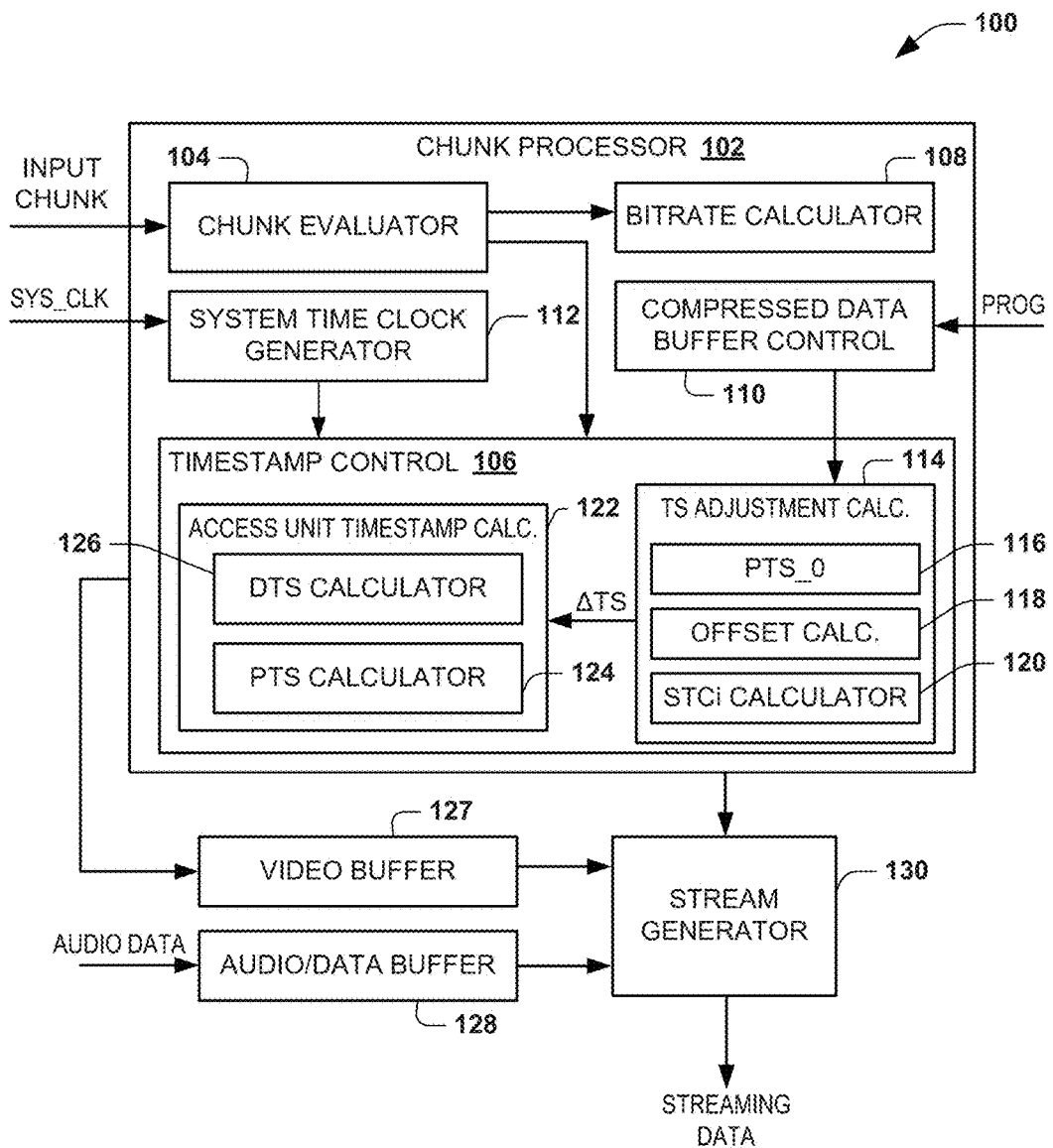
FIG. 4 depicts a functional block diagram for an ABR translator.

FIG. 4 depicts an example of an ABR translation system 100 configured to convert an ABR chunk of media (input chunk), which is provided according to a selected one of plural ABR profiles, to streaming data. The system 100 provides the streaming data as an output, such as can correspond to a program transport according to predetermined transport stream format, such as MPEG-2 or other transport stream format.

The system 100 includes a chunk processor 102 to convert the input chunk to corresponding streaming data in the transport stream format to facilitate transmission by an associated modulator (not shown—but see FIG. 1). The chunk processor 102 configured to process a series of chunks, which can be at different discrete bitrates and joined the chunks to provide a continuous stream of media content. The chunk processor 102 can be implemented in hardware (e.g., a field programmable gate array (FPGA), an application specific integrated circuit (ASIC), a microprocessor and/or other circuitry), in machine executable instructions embodied in a non-transitory medium (e.g., software or firmware) or a combination thereof.

The chunk processor 102 includes a chunk evaluator 104 that evaluates the given input chunk to provide corresponding information that characterizes the chunk as a whole or elements within the given chunk. The chunk evaluator 104 can extract selected information from one or more packets of a given chunk, such as metadata or other specified fields (e.g., adaptation fields). For example, chunk evaluator 104 identifies timestamps, including PTS and DTS, associated with access units that form the chunk being processed. Such timestamps can be periodically distributed within the chunk or be included within each access unit in the ABR chunk. Additionally, the chunk evaluator 104 can extract metadata representing the presentation duration for the given chunk, which may or may not be a fixed duration for all chunks. The chunk evaluator 104 further can determine the size of the given chunk (e.g., as a number of bits). The chunk evaluator 104 can provide extracted information to a timestamp control 106 and to a bitrate calculator 108.

The bitrate calculator 108 can compute a bitrate for streaming out the video for each respective chunk to ensure that each respective chunk is sent in a time equal to the chunk decode playout duration. As disclosed herein, the calculated bitrate for playout by the chunk processor 102 ensures that the decoder buffer level will return to the same equalized level at the start of each segment. The decoder buffer level can be predefined or user programmable in response to a user input.

The video chunk processor 102 also includes a compressed data buffer control 110 to restrict compressed data buffer utilization to a predetermined fractional part of the allowed maximum buffer utilization (e.g., based on a compressed data buffer utilization parameter). The compressed data control 110 can constrain the buffer utilization in this manner by setting a buffer utilization parameter, which is provided to control upstream encoders. For instance, upstream encoders can utilize the buffer utilization parameter for generating the ABR chunks for a number of ABR profiles. As one example, the compressed data control 110 can restrict the buffer utilization to about one-half the allowed maximum buffer utilization level. The buffer utilization level (e.g., via an end-to-end delay parameter may be further programmed via fine tuning (e.g., PROG) in response to a user input applied to a user interface accessible via a configuration manager, graphical user interface or other controls.

As an example, each upstream encoder that provides the ABR data is configured to not fully utilize the compressed data buffer size. If the utilized buffer is only a fraction, f, of the maximum decoder buffer size, Bmax, then the difference between the time taken to stream out the segment at its nominal rate, R, and the decoded duration of the clip will be limited to f*Bmax/R. This constrains the required change in rate to achieve buffer equalization of f*Bmax/D. The reduced utilization of the compressed data buffer at the upstream encoder also allows the buffer level at any point in the re-multiplexed MPTS output stream to be altered by (1−f)*Bmax without causing overflows or underflows at the decoder.

The video chunk processor 102 also includes a system time clock (STC) generator 112 configured to generate an STC value for output packets to provide a reference frame in response to a system clock associated with the system implementing the processor 102. The STC thus can provide a reference for the program corresponding to the series of chunks received and processed by the video chunk processor 102. The chunk processor 102 can provide a computed output STC value for each packet in the output stream, such as in an adaptation field thereof. The STC value can be used as the time at which to output the packet and as the value of the PCR timestamp in an adaptation field of the output packet.

The timestamp control 106 includes a timestamp adjustment calculator 114 that is programmed to determine an adjustment (e.g., change=ΔTS) for one or more timestamps including PTS and/or DTS. As mentioned, each packet within a given chunk has a corresponding output STC value that can be determined as a function of the initial STC value STC_0. The value of STC_0 is determined by the system time clock generator 112 as a function of the system clock time and for subsequent chunks by adding the previous chunk presentation duration to STC_0 from the previous chunk calculation. If the system time clock generator 112 determines that the difference between the STC_0 and the system time is greater than a prescribed threshold, an error can be triggered and the STC_0 value can be reset as a function of the system time.

The timestamp adjustment calculator 114 also can ascertain the initial adjusted PTS value for the chunk (PTS_0), demonstrated at 116, based on the information provided by the chunk evaluator 104. The initial PTS_0, for example, typically resides in a first packet of the chunk. Additionally, the timestamp adjustment calculator 114 includes an offset calculator 118 programmed to compute an offset between the STC at the start of the chunk and PTS_0 (STC:PTS_Offset). For example, the offset can be computed as a fixed offset as a function of the maximum encoder compressed data buffer utilization (e.g., established by compressed data buffer control 110). As one example, the PCR:PTS_Offset value can be computed as follows:

$$STC:PTS\_Offset = 1.25 * f * Bmax/R \quad \text{Eq. 1}$$

An STCi calculator 120 further can compute an output STC value for each packet in the chunk being processed. As an example, the STCi value for each output transport packet can be computed as follows:

$$STCi = STC\_0 + Pkt\# * 188 * 8 * 27E6/Sr \quad \text{Eq. 2}$$

where: Pkt# denotes the packet number, and
Sr denotes a segment playout rate (e.g., Sr=Segment_Size/Segment_Presentation_Duration, such as from chunk evaluator 104).

The timestamp adjustment calculator 114 can compute the timestamp adjustment ΔTS for each access unit in a given chunk as a function of PTS_0, the unadjusted PTS value for the first access unit in the chunk, STC_0, the STC value for the first output transport packet in the chunk, and the offset value STC:PTS_Offset. For example, the time adjustment calculator 114 can compute the change in timestamp as follows:

$$\Delta TS = STC\_0 - PTS\_0 + STC:PTS\_Offset. \quad \text{Eq. 3}$$

It should be understood that for a given program the offset should remain the same as a previous chunk from the same source. However, the timestamp adjustment calculator 114 can recompute the timestamp adjustment as noted above if the computed adjustment differs by a predetermined threshold with respect to the adjustment in the previous chunk. The ΔTS (e.g., computed by time adjustment calculator 114) can be output to chunk processors for other elementary streams in the same program. For those elementary streams' chunk processors, the ΔTS will be read as an input rather than being calculated using equation 3. For example, the ΔTS value from the video chunk processor for a given elementary stream of video can be fed as an input to the chunk processors for audio in the same program. Thus, chunk processors for such other elementary streams can be simplified by omitting a timestamp adjustment calculator, and instead receiving the computed ΔTS value.

The timestamp control 106 also includes an access unit timestamp calculator 122 that includes a PTS calculator 124 and a DTS calculator 126. Each of the PTS and DTS calculators 124 and 126 is programmed to calculate the PTSi and DTSi for packets in the given chunk being processed by adding the computed timestamp adjustment (e.g., ΔTS) to the current PTS and DTS values, such as provided in the metadata of packets in the given chunk. The timestamp control 106 can further determine additional synchronization and timing information based upon the transmission system in which the translator system 100 is implemented. For example, the synchronization and timing information can include a transmit timestamp that accounts for further processing delays in the data path associated with additional processing elements including multiplexers and the like through which the output stream is provided for downstream transmission.

By way of further example, the chunk processor 102 for a video elementary stream can provide the processed chunk to a video buffer 127 for combining and streaming with corresponding audio and data information. The audio and data information can be provided by one or more audio/data buffers 128. Each audio/data buffer 128 can process and store the audio data in one or more formats (e.g., corresponding to multiple elementary streams). As one example, the audio/data buffer 128 can receive processed audio chunks in one or more desired audio formats from an audio chunk processor, using computations similar to video chunk processor 102 for video. To maintain synchronization between video, audio, and other timestamped data, the same timestamp offset ΔTS is applied to all streams in the same program. As mentioned, in some examples, each chunk processor can compute timestamp offset ΔTS by its respective timestamp control block 106 or the timestamp offset ΔTS can be computed by one chunk processor and provided to the timestamp control clock of the other chunk processors. The timestamp control block 106 will set the output STC timestamp of each audio or data packet to prevent decoder buffer overflow or underflow for those streams. For example, the initial STC for the chunk can be calculated as:

$$STC\_0 = PTS\_0 + \Delta TS - STC:PTS\_Offset. \quad \text{Eq. 4}$$

A stream generator 130 can combine the video stream from buffer 127 with the processed audio and/or data from buffer 128 for sending the combined streams downstream in a transport stream. For example, the streaming generator 130 streams out the processed video chunks from the buffer 127 as well as associated audio and/or other data from buffer 128 in a corresponding playout duration by utilizing a variable bitrate. The bitrate calculator 108 can determine the variable bitrate for each respective chunk according to the predetermined chunk presentation duration and based on the adjusted timestamps. While the presentation duration of chunks in a given program stream can vary from one chunk to the next chunk in the given stream, the playout duration of each chunk is equal to the corresponding presentation duration in each respective chunk.

The stream generator 130 thus provides the output streaming data for downstream transmission, such as modulation by a QAM modulator. The timestamp and bit rate processing provided by the ABR translator 100 allow chunks from different profiles to be concatenated without introducing artifacts in the output of downstream decoders.

Figure 5:
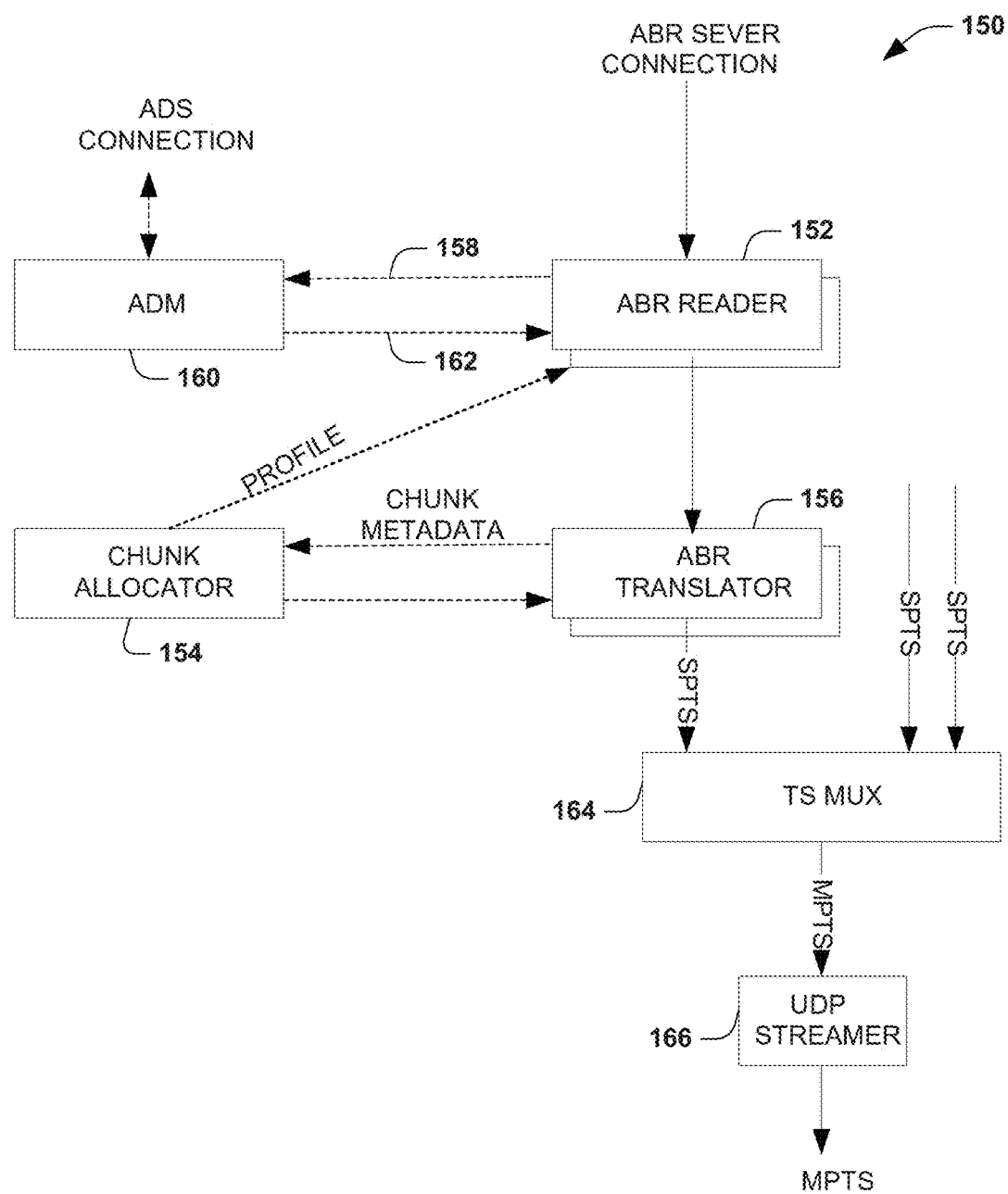
FIG. 5 depicts an example of a system that implements one or more ABR translators for sending a multi-program transport stream.

FIG. 5 depicts an example of a transmission system 150 that can be utilized for statistically or otherwise multiplexing a plurality of programs, according to selected profiles, which can be aggregated to provide a multi-program transport stream (MPTS). The system 150 includes one or more ABR readers 152 that can be connected to a content delivery network that includes encoded ABR content. For example, the ABR content can reside at a national headend (e.g., including a plurality of channels at various ABR bitrates) as well as more local content (e.g., provided by a regional headend at one or more ABR bitrates). The encoded ABR content data thus can be accessed by the ABR reader 152 in response to profile selection information provided by a chunk allocator 154.

In some examples, the chunk allocator 154 can implement statistical multiplexing, including based on chunk metadata provided by an ABR translator 156. The metadata can be provided across all programs in the multiplexed stream to enable the chunk allocator 154 to determine and make profile selections for each of the channels. The system 150 can include an ABR translator for each program, each of which can provide chunk metadata to the chunk allocator 154. For example, the ABR translator 156 can be implemented according to translator 10 or 100 of FIG. 1 or 4, and thus can include a chunk evaluator 104 that can extract metadata and other information associated with each given chunk that is provided by the ABR reader 152. The chunk allocator 154 can thus implement metrics contained within or derived from the chunk metadata, such as including encoded bitrate, segment duration bitrate, time period and a quality metric associated with the given chunk or a series of chunks. The chunk allocator 154 thus can employ the chunk metadata for each chunk of each program to select profiles that equalize quality metrics across all of the channels and further utilize the highest quality segments that will fit into the bandwidth of the corresponding output channel. Thus in response to the profile selection information provided by the allocator 154, the ABR reader employs the selected profile to read each chunk for each program.

Additionally, the ABR reader 152 can provide ad placement opportunity information 158 to an add management (ADM) service 160 such as programmed to employ an ad decision service (ADS), such as via a corresponding network connection. The ADM service 160 can provide placement information and corresponding profile information for ADS to the ABR reader 152. For example, the ADS can include profile information that enables ABR reader to set the corresponding ABR profile for a given ad that is to be inserted based upon the available ad placement opportunities. The ABR reader 152 thus can obtain corresponding placement data 162 for the selected profile of the ad—similar to the ABR data that is read from ABR server. For example, the ADM 160 can utilize a connection register for each active channel into which ads are to be placed. The placement availability information 158 is utilized by ADM 160 to request a placement from a corresponding ad decision service, which results in placement and profile selection information being provided by the ABR reader 152 such as corresponding to an ABR profile for the selected ad for each respective channel into which ads are to be placed. Due to the nature of the processing provided by the ABR translator 156, chunks selected from two or more different ABR sources can be spliced at chunk boundaries without introducing presentation artifacts at the output of downstream decoders.

The ABR translator 156 thus is programmed as disclosed herein to process the chunks from the ABR reader 152 to provide a corresponding streaming output demonstrated as a single program transport stream. In the system 150 there can be a plurality of ABR translators each of which can provide a corresponding SPTS. A corresponding transport stream (TS) multiplexor 164 thus can receive the plurality of SPTS streams (each including multiple elementary streams) and combine the packets from the plurality of input streams to a single MPTS. The TS multiplexer 164 further can adjust STC values, as necessary, streaming them out in multi-packet bursts for corresponding transmission to a streamer 166. The streamer 166 can implement a connectionless transport layer protocol and thus provide a linear output stream according to a corresponding protocol (e.g., UDP, such as RTP via UDP). The output stream can in turn be modulated and transmitted over a corresponding network, such as a cable or other broadcast network (e.g., satellite or terrestrial) for use at downstream clients. The processing of the ABR chunks by the ABR translator, as disclosed herein, can ensure that the streams at the downstream clients remain compliant with the transport protocol (e.g., MPEG-2), namely, that the decoder buffer does not overflow as a selected program is decoded for playout on one or more corresponding devices (e.g., set top box, television, smart phone, tablet computer, desktop computer or the like).

Figure 6:
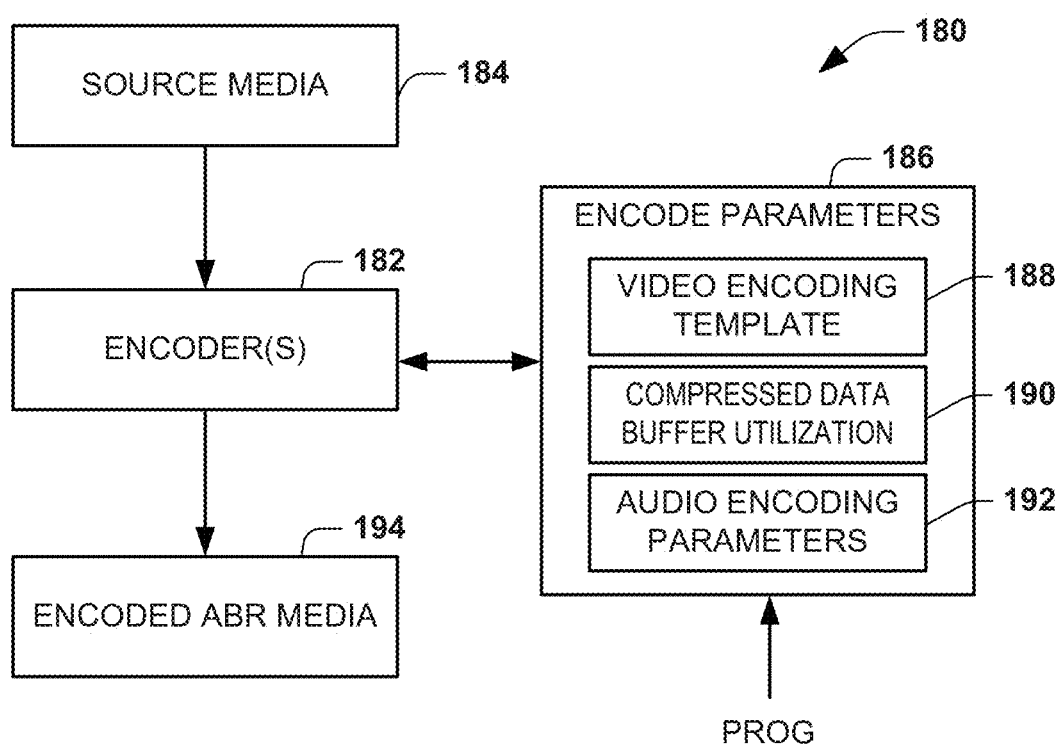
FIG. 6 depicts an example of an encoder system to generate ABR chunks.

FIG. 6 depicts an example of an encode system 180 that can be utilized to generate encoded media chunks, which can include encoded audio, video and/or other data. The system 180 thus can provide the chunks of encoded ABR media 194, which can be processed by the ABR translator systems (e.g., translator 10, 100 and/or 156) or methods (e.g., method 200) disclosed herein. In the example of FIG. 6, the encode system 180 includes one or more encoders 182 that encode source media 184 according to encode parameters 186.

The source media 184, for example, can be a source media file, such as can be an uncompressed high definition or standard definition file (e.g., stored in one or more computer-readable media). In other examples, the source media 184 can be a compressed file format, such as according to one of the MPEG or other compression format (e.g., H.264 or H.265). In some examples, the source media 184 can be received as streaming media includes a series of digital media blocks. In either example, the source media 184 includes digital data representing a series of pictures (e.g., images) and ancillary data, such as can include audio data (e.g., encoded or uncompressed), subtitles, and related metadata associated with each picture.

By way of example, for encoding video, the encoder 182 can process the source media 184 and provide an output stream of media chunks according to video encoding parameters 188. For a given ABR profile, the encoder 182 can employ a corresponding encoding template to control the encode process based on the corresponding video encoding parameters (e.g., video codec, one or more bit rates, resolution, frame rate, and the like) 188. The encoder 182 can also receive a compressed data buffer utilization parameter (e.g., a VBV buffer utilization level for video data) 190 to constrain buffer input/output levels for the corresponding encoding process that is performed with respect to each block of media. Such constraints can mitigate underflow and overflow of video decoder buffers in downstream receivers. As disclosed herein, the buffer utilization parameter 190 can be set to a default value, be programmed by a compressed data buffer control (e.g., block 110 of chunk processor 102) and/or be programmed in response to a user input. For example, the buffer utilization can be set to about one-half the allowed maximum buffer utilization level, which may remain fixed or be adjusted in response to a program input.

The encoder(s) 182 can also include one or more audio encoders that employ an audio codec to convert the audio data in the source media 184 into one or more target audio formats and/or languages according to audio encoding parameters 192. In some cases, the audio encoding can also employ a compressed data buffer utilization parameter to mitigate underflow and overflow of audio decoder buffers.

The encoder 182 provides encoded ABR media 194 according to the encode parameters 186 utilized for encoding each ABR profile to which the source media is encoded. The encoded ABR media 194 can be stored in a server (e.g., an origin server), such as part of a content delivery network that feeds ABR media for an ABR translator, as disclosed herein. The encoder 182 can also generate a manifest file according to encode and decode parameters for each profile to which the source media is encoded.

Figure 7:
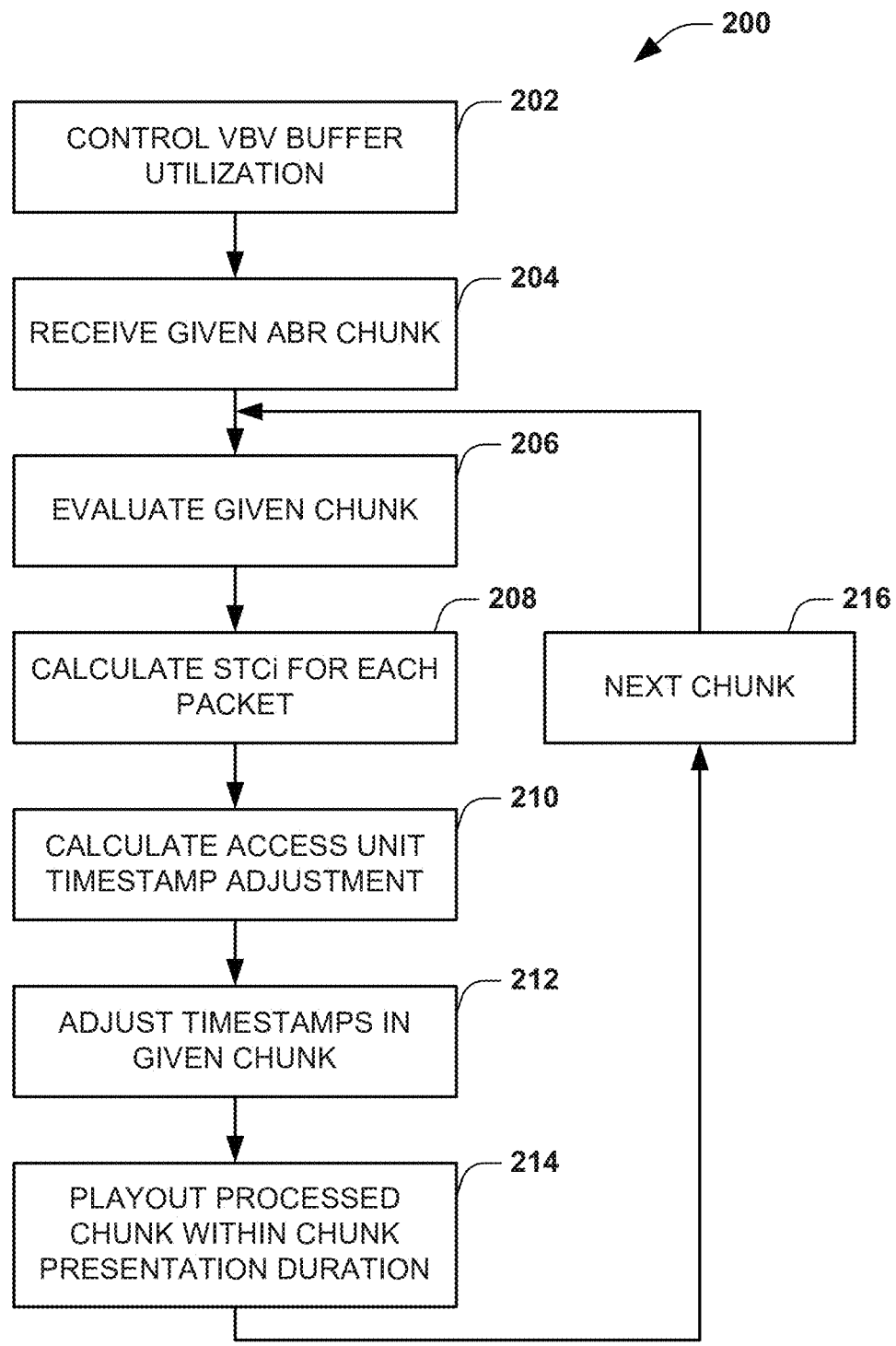
FIG. 7 is a flow diagram of a method for translating ABR chunks to another media stream.

In view of the structural and functional features described above, certain methods will be better appreciated with reference to FIG. 7. It is to be understood and appreciated that the illustrated actions, in other embodiments, may occur in different orders or concurrently with other actions. Moreover, not all features illustrated in FIG. 7 may be required to implement a method. It is to be further understood that the following method can be implemented in hardware (e.g., one or more processors, such as in a computer, field programmable gate array, or an application specific integrated circuit), software (e.g., stored in a computer readable medium or as executable instructions running on one or more processors), or as a combination of hardware and software.

FIG. 7 is a flow diagram depicting an example of a method 200 for converting ABR chunks to streaming media in another non ABR format such as a connection protocol such as UDP. The method can be implemented by components of an ABR translator, such as translator 10 or translation system 100 disclosed herein. At 202, compressed data buffer utilization is controlled (e.g., by compressed data buffer control 20 or 110). For example, the buffer utilization can be set to a predetermined fractional part of a maximum compressed data buffer level. The buffer utilization thus can be employed by one or more encoders utilized for generating ABR chunks that can be selectively read according to profile information that is determined for one or more programs. Additionally, as disclosed herein, the compressed data buffer utilization can be programmable such as in response to a user input.

At 204, a given ABR chunk is received at an input of a translator, such as according to a selected ABR profile. At 206, the given chunk is evaluated (e.g, by chunk evaluator 104). The evaluation at 206 can include ascertaining chunk characteristics, such as from metadata representing chuck duration, chunk size (e.g., a number of bits). Additional information associated with the chunk can also be determined, such as corresponding to an output STC that is derived based upon a system time clock. At 208, a $STC_i$ for each packet is calculated (e.g., by system time clock calculator 120). The $STC_i$ value for each packet can be determined such as disclosed herein (see, e.g., Eq. 2).

At 210, timestamp adjustments are calculated (e.g., by timestamp adjustment calculator 114). For example, the adjustment for PTS and/or DTS timestamps can be computed based on the difference between the initial timestamp for the given elementary stream and the $STC_i$ (from 208) and the STC to PTS offset that has been established (see, e.g., Eq. 1). For example, the STC:PTS offset can be a fixed value that is based on the maximum compressed data buffer utilization established at 202 (e.g., by compressed data buffer control block of FIG. 4).

At 212, timestamp adjustments for the given chunk are calculated (e.g., by access unit timestamp calculator 122). The timestamp adjustments can include adding the timestamp adjustment computed at 212 to each PTS and/or DTS value associated with respective access units in the given chunk (see, e.g., Eq. 3). Additional timestamp adjustments can include assigning a transmit STCi time to each output transport packet in the chunk, such as can be system time clock values for a given output packet plus delays associated with downstream multiplexing components. Additional timestamps can include inserting PCR values into the chunk at a fixed duration as samples of the STCi values.

At 214, the corresponding video can be streamed out via a playout engine such that the processed chunk (e.g., including adjusted timestamps and programmed compressed data buffer utilization levels) is played out at a variable bitrate within the defined chunk presentation duration. From 214, the method proceeds to 216 in which a next chunk can be read from a corresponding ABR source according to a selected profile. As disclosed herein, the next chunk that is received can be from the same or different ABR profile as the previous chunk. For example, different profiles can be selected based upon selecting a different profile from the same source or in response to ad insertion from another source. The method then can proceed from 206 to 214 to similarly process the next chunk for generating the corresponding output stream then the desired streaming format that can be provided in a corresponding transport stream to downstream clients.

As will be appreciated by those skilled in the art, portions of the systems and methods disclosed herein may be embodied as a method, data processing system, or computer program product (e.g., a non-transitory computer readable medium having instructions executable by a processor or other hardware, such as an FPGA). Accordingly, these portions of the present invention may take the form of an entirely hardware embodiment, an entirely software embodiment, or an embodiment combining software and hardware. Furthermore, portions of the invention may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments are disclosed herein with reference to flowchart illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in a non-transitory computer-readable medium that can direct a computer or other programmable data processing apparatus (e.g., one or more processing core) to function in a particular manner, such that the instructions stored in the computer-readable medium result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks or the associated description.

What are disclosed herein are examples. It is, of course, not possible to describe every conceivable combination of components or methods, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method comprising:
   receiving, at a device, a series of chunks of media content encoded according to an adaptive bitrate format, each chunk comprising a number of access units;
   at the device, setting a buffer utilization value for a compressed data buffer;
   at the device, preprocessing each packet in a given chunk of media content to provide a preprocessed chunk, the preprocessing comprising:
      evaluating the given chunk of media content to provide chunk information characterizing the access units of the given chunk identify respective timestamps associated with the access units of the given chunk; and
      adjusting the timestamp of each packet in the given chunk to be at an offset with respect to a clock reference value at the beginning of the given chunk based on the chunk information, the preprocessed chunk includes the adjusted timestamps for each packet and the buffer utilization value; and
   streaming, from the device, the preprocessed chunk in an output transport stream of concatenated chunks at variable bitrate set according to a predetermined chunk presentation duration and based on the adjusted timestamps, whereby the adjusted timestamps and the buffer utilization value mitigate discontinuities between starting and ending compressed data buffer levels for the concatenated chunks.

2. The method of claim 1, wherein adjusting the timestamps further comprises adjusting each of a presentation timestamp and a decode timestamp in each access unit of the given chunk so that starting and ending buffer levels for the given chunk are substantially equal.

3. The method of claim 1, wherein adjusting the timestamps further comprises adjusting of each of a presentation timestamp and a decode timestamp in each access unit of the given chunk to be at offset with respect to the clock reference value at the beginning of the given chunk.

4. The method of claim 3, wherein the offset is a fixed offset value that is set based on the buffer utilization value.

5. The method of claim 1, wherein setting the buffer utilization value further comprises setting a buffer utilization level of the compressed data buffer to a predetermined fraction of a maximum buffer size.

6. The method of claim 5, further comprising adjusting the buffer utilization level of the compressed data buffer in response to a user input to decrease delay through the compressed data buffer.

7. The method of claim 1, wherein the chunks of media content include at least two different ABR profiles for the same or different program content.

8. The method of claim 1, wherein streaming the preprocessed chunk further comprises computing the variable bitrate for streaming each packet of the given chunk in the output transport stream such that a starting buffer level and an ending buffer level for the given chunk are substantially equal.

9. The method of claim 8, wherein the starting buffer level at a start of a first access unit of the given chunk is substantially the same as the buffer level at the start of the first access unit of the previous chunk.

10. The method of claim 1, further comprising modulating the output transport stream for broadcast downstream.

11. The method of claim 1, further comprising:
    computing a chunk playout rate based on a size and presentation duration of the given chunk; and
    computing a timestamp adjustment to apply to each timestamp in the given chunk, the adjusted timestamps of each packet in the given chunk being adjusted according to the timestamp adjustment.

12. A system, comprising:
    an input connected to receive adaptive bitrate (ABR) chunks of media content, each chunk comprising a number of access units;
    ABR translator circuitry to process the ABR chunks to provide an output stream that is compliant with a transport protocol, the ABR translator circuitry comprising:
       compressed data buffer controller circuitry to set a buffer utilization parameter to constrain utilization of a decode buffer to a buffer level that is a fractional part of a maximum buffer level, the ABR chunks being encoded based on the buffer utilization parameter;
       chunk evaluator circuitry that evaluates each of the ABR chunks to provide corresponding information characterizing each of the ABR chunks; and
    timestamp control circuitry to adjust at least one presentation or decode timestamp of the access units in each of the ABR chunks based on the corresponding information to provide preprocessed chunks, each preprocessed chunk including the adjusted timestamps having a predetermined offset with respect to a program clock reference at the beginning of each ABR chunk,
    wherein the ABR translator circuitry generates the output stream that by concatenating the preprocessed chunks to provide the output stream at a bitrate that maintains a playout duration of each chunk equal to a corresponding chunk presentation duration thereof and that mitigates discontinuities between starting and ending compressed data buffer levels.

13. The system of claim 12, wherein the timestamp control circuitry further comprises:
    timestamp adjustment calculator circuitry to compute a timestamp adjustment value for each access unit in a given chunk as a function of a timing offset, an output system time clock value for a first access unit of the given chunk and an unadjusted first presentation timestamp in the given chunk; and packet timestamp calculator circuitry to compute the adjusted timestamps for each access unit in the given chunk based on the timestamp adjustment value such that starting and ending levels of the decode buffer are substantially equal during playout of the given chunk.

14. The system of claim 13, wherein the timestamp adjustment calculator circuitry further comprises:

offset calculator circuitry to compute the timing offset for the given chunk as a fixed offset value that is set based on the buffer utilization parameter; and system time clock calculator circuitry to compute the output system time clock value for each respective output transport packet in the given chunk.

15. The system of claim 12, wherein the buffer utilization parameter is programmable in response to a user input to decrease buffer delay of the decode buffer.

16. The system of claim 12, further comprising chunk allocator circuitry to specify an ABR profile to select each of the ABR chunks provided to the input, wherein the ABR profile includes include at least two different ABR profiles for consecutive ABR chunks.

17. The system of claim 16, wherein the chunk allocator circuitry selects the ABR chunks from at least two different ABR sources.

18. The system of claim 12, wherein the ABR translator circuitry further comprises bitrate calculator circuitry to compute the bitrate as a variable bitrate for streaming the packets of the preprocessed chunks in the output stream such that a starting buffer level and an ending buffer level for each respective chunk remain substantially equal.

19. The system of claim 12, further comprising a modulator to modulate the output stream provided by the ABR translator for broadcast downstream.

20. The system of claim 19, wherein the ABR translator is to provide the output stream according to a user datagram protocol.

21. The system of claim 12, wherein the ABR translator circuitry comprises a plurality of ABR translator circuitries connected to receive and process ABR chunks for a plurality of channels to provide a respective transport stream for each of the plurality of channels, the system comprising a multiplexer to combine each of the transport streams and provide a multi-program transport stream.

22. A system, comprising:

an input connected to receive adaptive bitrate (ABR) chunks of media content, each chunk comprising a number of access units;

instructions stored in one or more non-transitory machine-readable media and executable by a processor, the instructions programmed to:

process the ABR chunks to provide an output stream that is compliant with a transport protocol, the processing of ABR chunks further including instructions to:

set a buffer utilization parameter to constrain utilization of a decode buffer to a buffer level that is a fractional part of a maximum buffer level, the ABR chunks being encoded based on the buffer utilization parameter;

evaluate each of the ABR chunks to provide corresponding information characterizing each of the ABR chunks; and adjust at least one presentation or decode timestamp of the access units in each of the ABR chunks based on the corresponding information to provide preprocessed chunks, each preprocessed chunk including the adjusted timestamps having a predetermined offset with respect to a program clock reference at the beginning of each ABR chunk;

wherein the output stream is generated by concatenating the preprocessed chunks to provide the output stream at a bitrate that maintains a playout duration of each chunk equal to a corresponding chunk presentation duration thereof and that mitigates discontinuities between starting and ending compressed data buffer levels.

* * * * *